United States Patent
Dudar et al.

(10) Patent No.: US 11,097,940 B2
(45) Date of Patent: *Aug. 24, 2021

(54) METHODS AND APPARATUS TO ENSURE GROUNDING BETWEEN VEHICLES DURING VEHICLE-TO-VEHICLE REFUELING OPERATIONS

(71) Applicant: Ford Motor Company, Dearborn, MI (US)

(72) Inventors: Aed M. Dudar, Canton, MI (US); Dennis Seung-Man Yang, Canton, MI (US); Heather L. Knechtges, Saline, MI (US)

(73) Assignee: Ford Motor Company, Dearborn, MI (US)

( * ) Notice: Subject to any disclaimer, the term of this patent is extended or adjusted under 35 U.S.C. 154(b) by 76 days.

This patent is subject to a terminal disclaimer.

(21) Appl. No.: 16/343,564

(22) PCT Filed: Oct. 25, 2016

(86) PCT No.: PCT/US2016/058656
§ 371 (c)(1),
(2) Date: Apr. 19, 2019

(87) PCT Pub. No.: WO2018/080448
PCT Pub. Date: May 3, 2018

(65) Prior Publication Data
US 2019/0256343 A1    Aug. 22, 2019

(51) Int. Cl.
*B67D 7/32* (2010.01)
*B60K 15/03* (2006.01)
*B60K 15/035* (2006.01)

(52) U.S. Cl.
CPC ............ *B67D 7/3236* (2013.01); *B60K 15/03* (2013.01); *B60K 2015/03203* (2013.01);
(Continued)

(58) Field of Classification Search
CPC .......... B67D 7/06; B67D 7/32; B67D 7/3236; B67D 7/36–367; B67D 7/425;
(Continued)

(56) References Cited

U.S. PATENT DOCUMENTS

| 3,814,148 A | 6/1974 | Wostl |
| 3,815,784 A | 6/1974 | Hansel |

(Continued)

FOREIGN PATENT DOCUMENTS

| CN | 202294251 | 7/2012 |
| CN | 104537508 | 4/2015 |
| CN | 104925730 | 9/2015 |

OTHER PUBLICATIONS

Jenkins, Gavin, "On-Demand Fuel Services Could Make Gas Stations Go Extinct", May 20, 2016, 5 pages.
(Continued)

*Primary Examiner* — Thienvu V Tran
*Assistant Examiner* — Carlos O Rivera-Perez
(74) *Attorney, Agent, or Firm* — Brandon Hicks; Hanley, Flight & Zimmerman, LLC

(57) ABSTRACT

Example methods and apparatus to ensure grounding between vehicles during a vehicle-to-vehicle refueling operation are described herein. An example vehicle described herein is to receive fuel from a refueling vehicle via a vehicle-to-vehicle refueling operation. The example vehicle includes a fuel tank having a vent passageway, a valve coupled to the vent passageway, and a controller to close the valve if the vehicle and the refueling vehicle are not electrically coupled during the vehicle-to-vehicle refueling operation.

14 Claims, 8 Drawing Sheets

(52) U.S. Cl.
CPC ............... *B60K 2015/03217* (2013.01); *B60K 2015/03302* (2013.01); *B60K 2015/03566* (2013.01)

(58) Field of Classification Search
CPC .. B67D 7/465; B67D 2007/545; B60K 15/00; B60K 15/03; B60K 15/03019; B60K 15/03026; B60K 15/035; B60K 15/03504; B60K 15/03519; B60K 2015/0319; B60K 2015/03197; B60K 2015/03203; B60K 2015/03217; B60K 2015/03323; B60K 2015/03256; B60K 2015/03302; B60K 2015/03328; B60K 2015/03375; B60K 2015/03401; B60K 2015/03434; B60K 2015/03542; B60K 2015/03547; B60K 2015/03552; B60K 2015/03557; B60K 2015/03561; B60K 2015/03566; B60K 2015/03576; B60K 2015/0358; B60K 2015/0359; B60K 2015/03595; B65D 90/22; B65D 90/28; B65D 90/30; B65D 90/46; H05F 1/00; F02M 25/08–089
USPC ............... 361/1–3, 133, 134, 136, 212, 215, 361/216–219; 141/94–96, 98, 198, 141/206–211, 346
See application file for complete search history.

(56) References Cited

U.S. PATENT DOCUMENTS

| | | | |
|---|---|---|---|
| 4,901,195 A | 2/1990 | Stemporzewski, Jr. | |
| 5,983,962 A | 11/1999 | Gerardot | |
| 5,988,439 A | 11/1999 | Webb | |
| 6,082,392 A | 7/2000 | Watkins, Jr. | |
| 6,522,947 B1 | 2/2003 | Hartsell, Jr. | |
| 6,601,617 B2 | 8/2003 | Enge | |
| 6,655,424 B2 * | 12/2003 | Kawazu | B60K 15/04 141/83 |
| 6,786,245 B1 | 9/2004 | Eichelberger et al. | |
| 7,412,994 B2 | 8/2008 | Corless et al. | |
| 7,661,446 B2 | 2/2010 | Megiddo | |
| 9,188,092 B2 * | 11/2015 | McAvey | F02M 37/0088 |
| 2010/0276031 A1 | 11/2010 | Saiki et al. | |
| 2013/0081738 A1 | 4/2013 | Fedde et al. | |
| 2013/0312871 A1 | 11/2013 | Hoffjann et al. | |
| 2014/0129379 A1 | 5/2014 | Tryba | |
| 2014/0230795 A1 | 8/2014 | Jentz et al. | |
| 2014/0374177 A1 | 12/2014 | Yang et al. | |
| 2016/0221436 A1 | 8/2016 | Lindlbauer et al. | |
| 2016/0244252 A1 | 8/2016 | Beard | |

OTHER PUBLICATIONS

International Searching Authority, "International Search Report and Written Opinion", issued in connection with International Application No. PCT/US2016/058656, dated Jan. 3, 2017, 13 pages.

International Searching Authority, "International Search Report and Written Opinion", issued in connection with International Application No. PCT/US2016/058657, dated Jan. 3, 2017, 13 pages.

China National Intellectual Property Administration, "First Office Action", issued in connection with application No. 2016800902968 dated Aug. 4, 2020, 21 pages.

United States Patent and Trademark Office, "Non-Final Office Action," issued in connection with U.S. Appl. No. 16/343,592, dated Aug. 21, 2020, 9 pages.

United States Patent and Trademark Office, "Notice of Allowance and Fee(s) Due," issued in connection with U.S. Appl. No. 16/343,592, dated Apr. 16, 2021, 7 pages.

China National Intellectual Property Administraction, "Notification of Second Office Action," issued in connection with Chinese Application No. 2016800902987, dated Dec. 23, 2020, 23 pages (includes English language version).

China National Intellectual Property Administration, "Second Office Action," issued in connection with Chinese Application No. 2016800902968, dated Apr. 22, 2021, 13 pages.

United States Patent and Trademark Office, "Final Office Action," issued in connection with U.S. Appl. No. 16/343,592, dated Jan. 19, 2021, 10 pages.

* cited by examiner

METHODS AND APPARATUS TO ENSURE GROUNDING BETWEEN VEHICLES DURING VEHICLE-TO-VEHICLE REFUELING OPERATIONS

FIELD OF THE DISCLOSURE

This disclosure relates generally to vehicle-to-vehicle refueling operations and, more particularly, to methods and apparatus to ensure grounding between vehicles during vehicle-to-vehicle refueling operations.

BACKGROUND

Vehicle owners frequently desire to have their vehicles filled with fuel without having to visit a gas station. Vehicle-to-vehicle refueling services have emerged that send a refueling vehicle, such as a truck, to the owner's vehicle and fill it with fuel (while the owner is or is not present). For instance, the owner can leave his/her vehicle in a parking lot while the owner is at work, and the refueling truck meets the vehicle in the parking lot and refuels the fuel tank. During refueling, a ground wire is to be connected between the two vehicles to prevent electrical potential differences between the two vehicles, which could lead to an electrostatic discharge, such as a spark.

SUMMARY

Disclosed herein is an example vehicle to receive fuel from a refueling vehicle via a vehicle-to-vehicle refueling operation. The example vehicle includes a fuel tank having a vent passageway, a valve coupled to the vent passageway, and a controller to close the valve if the vehicle and the refueling vehicle are not electrically coupled during the vehicle-to-vehicle refueling operation.

An example method disclosed herein includes determining, via a controller, whether a first vehicle is electrically coupled to a second vehicle. In the example method, the first vehicle is to receive fuel from the second vehicle during a vehicle-to-vehicle refueling operation. The example method includes determining, via the controller, whether fuel is being added to a fuel tank of the first vehicle and closing, via the controller, a valve in a vent passageway of the fuel tank based on a determination by the controller that the first and second vehicles are not electrically coupled and fuel is being added to the first vehicle.

An example computer readable storage medium is disclosed herein that includes instructions that, when executed, cause a processor to at least determine whether a first vehicle is electrically coupled to a second vehicle. The first vehicle is to receive fuel from the second vehicle during a vehicle-to-vehicle refueling operation. The instructions also cause the processor to determine whether fuel is being added to a fuel tank of the first vehicle and close a valve in a vent passageway of the fuel tank based on a determination that the first and second vehicles are not electrically coupled and fuel is being added to the first vehicle.

Figure 1:
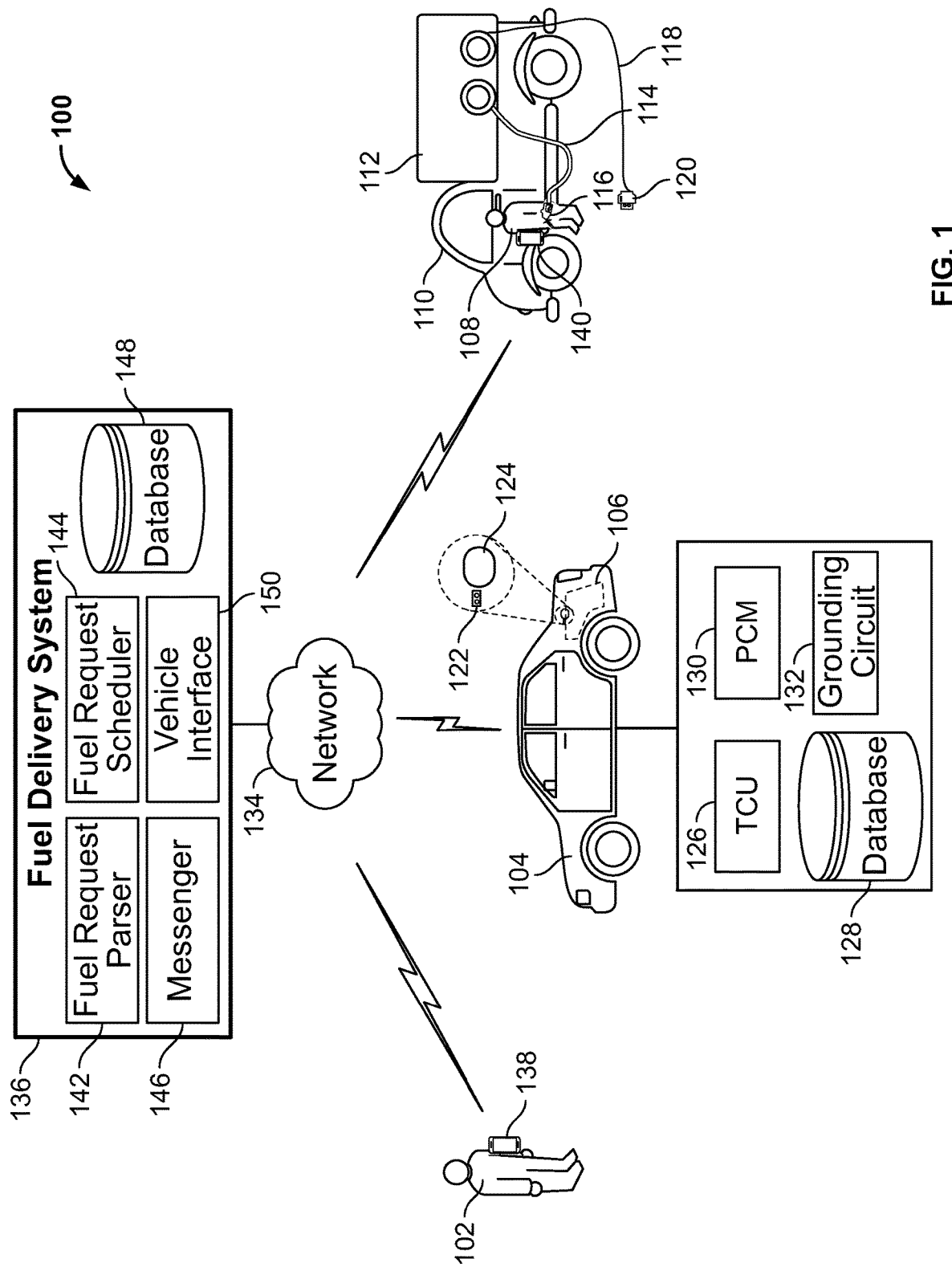
FIG. 1 illustrates an example system for scheduling and performing an example vehicle-to-vehicle (V2V) refueling operation between an example vehicle and an example refueling vehicle.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

DETAILED DESCRIPTION

Example methods, apparatus/systems and articles of manufacture are disclosed herein for preventing or impeding vehicle-to-vehicle (V2V) refueling when the two vehicles are not properly electrically coupled. V2V refueling can cause an electrostatic potential between the vehicles if not properly electrically coupled. Such an electrostatic potential can lead to a spark, which is dangerous in the presence of liquid fuel. Therefore, the example methods, apparatus/systems and articles of manufacture advantageously prevent or impede V2V refueling unless the two vehicles are properly electrically coupled, such as with a ground cable. Before describing the aspects of the present disclosure in detail, a description of the electrostatic potential problem is provided below.

During refueling of a vehicle, static electricity can build up from the interaction of liquid fuel and a filler pipe (e.g., inlet nozzle) being dissimilar materials. Potential for electrostatic discharge (e.g., a spark) is directly related to the fluid properties (e.g., conductivity of the fluid) and the movement of the fluid through a component. This phenomena is known as flowing fluid electrification, and the result of this phenomena is known as triboelectric charging, which occurs between a wall of the filler pipe and the flowing liquid fuel. The interface of the liquid fuel flowing across the wall of the filler pipe creates a dissimilar material interface (triboelectric charging) that results in a charge double layer, subsequent separation (e.g., if ideal conditions exist) and potential accumulation in the form of a streaming current as the liquid fuel continues to flow. This generation of a streaming current is based upon the interaction of the fluid properties and the wall of the filler pipe. Unlike gas station pumps, which include a strap to ground the pump handle, no electrical coupling occurs naturally between two vehicles. As a result, if the two vehicles in the V2V refueling operation are not electrically coupled, an electrostatic potential (sometimes referred to as an electric potential, a voltage difference, a charge potential, etc.) between the two vehicles can be generated by the flowing fuel. Such an electrostatic potential is extremely dangerous, because it may cause an electrostatic discharge, in the form of a spark, in the presence of the liquid fuel. Thus, during a V2V refueling operation, the refueling vehicle and the vehicle receiving the fuel are to be electrically coupled. The refueling vehicle typically includes a ground cable (e.g., a wire) that is to be connected between the two vehicles prior to refueling. The ground cable may be connected to the frames or bodies of the vehicles, which equalizes any electrostatic potential built up between the two vehicles prior to and during the V2V refueling operation.

However, this process leaves room for potential human error. In particular, a service operator (e.g., a person responsible for dispensing fuel into the vehicle) may fail to connect the ground cable prior to commencing the V2V refueling operation. For example, with increased demand and timing constraints, service operators may skip connecting the ground cable to save time. In other instances, a service operator may forgot to connect the ground cable. However, as mentioned above, without the ground cable connection to electrically couple the two vehicles, the potential for an electrostatic spark is greatly increased.

Example methods, apparatus/system and articles of manufacture disclosed herein prevent or substantially impede a V2V refueling operation unless the two vehicles are properly electrically coupled. As used herein, the terms electrically coupled, electrically bonded, and electrically connected may be used interchangeably and mean that two structures (e.g., a first vehicle and a second vehicle) are coupled in such a way an electrical potential between the two structures is equalized between the two structures. In some examples disclosed herein, the vehicle in need of refueling includes a power-train control module (PCM) (e.g., a controller) to determine whether the two vehicles are electrically coupled (e.g., whether a ground cable is properly connected between the two vehicles) and performs one or more operations to prevent or impede the V2V refueling operation if the two vehicles are not properly electrically coupled.

Some example vehicles disclosed herein include a vent passageway coupled to a fuel tank of the vehicle. A valve (e.g., a vapor bypass valve (VBV) and/or canister vent shut (CVS) valve) is coupled to the vent passageway and normally remains open to vent vapor pressure build-up in the fuel tank. In some examples disclosed herein, if the two vehicles are not properly electrically coupled, the PCM instructs the valve to close. Traditionally, when fueling at a gas station, for instance, as fuel is added into the vehicle fuel tank, the displaced air in the tank is pushed through the vent passageway and out into the atmosphere (e.g., after going through a charcoal canister to remove pollutants). However, if the valve in the vent passageway is closed, displaced air is forced back up through the filler pipe. Therefore, instead of venting through the vent passageway, the displaced air is pushed up through the filler pipe, which activates the pump shutoff trigger in the pump handle (similar to how a pump handle turns off when the fuel tank is full). The service operator may attempt to begin fueling again, but the same effect occurs. Otherwise, the service operator can pump fuel at a relatively slow rate, such that the displaced air is not ejected with enough force to activate the pump shutoff trigger. Therefore, the service operator is either prevented from pumping gas or impeded from pumping gas at full speed, thereby reducing the risk of triboelectric charging and the associated dangers described above.

In some examples, the PCM determines whether the two vehicles are properly electrically coupled based on a signal from a grounding circuit. In some examples, the grounding circuit produces a signal when the ground cable is properly connected between the two vehicles. In some examples, the grounding circuit includes a relay that is energized (e.g., by the batteries of the two vehicles) when the two vehicles are electrically coupled. When the relay is energized, a signal is sent to the PCM, which indicates the two vehicles are properly electrically coupled. If the ground cable is connected between the two vehicles, the PCM instructs the valve to open (or allows the valve to remain open), which enables displaced air in the fuel tank to be vented to the atmosphere through the vent passageway. However, if the two vehicles are not properly electrically coupled, then no signal is produced, and the PCM determines that the two vehicles are in danger of producing an electrostatic spark. If the PCM determines fuel is being added to the fuel tank (e.g., based on a fuel level sensor), the PCM instructs the valve in the vent passageway to close, as described above, which triggers the pump shutoff trigger in the pump handle. If the ground cable is connected, the PCM may then instruct the valve in the vent passageway to reopen, thereby enabling the V2V refueling operation to continue.

The example methods, apparatus/systems and articles of manufacture disclosed herein may also be implemented with vehicles having locked fuel doors, such as a hybrid vehicles. Some hybrid vehicles have sealed fuel tanks because the vehicles utilize the gas engine significantly less than traditional vehicles having only an internal combustion engine. As such, the fuel door is locked (e.g., via a lock) to prevent persons from opening the fuel tank until the fuel tank is depressurized. In some examples, the PCM of the vehicle does not unlock the fuel door until the ground cable is connected and the two vehicles are properly electrically coupled. In some examples, the PCM determines whether the ground cable is connected based on a signal from the grounding circuit. After the ground cable is connected (and, in some examples, after the fuel tank is depressurized), the PCM unlocks the fuel door, which enables the service operator to commence the V2V refueling operation. Otherwise, the locked fuel door serves as an indicator to the service operator that the fueling operation should not occur until the ground cable is connected between the two vehicles.

Turning in detail to the figures, FIG. 1 illustrates an example system 100 for scheduling and/or performing a V2V refueling operation. In the illustrated example, a driver 102 desires his/her vehicle 104 (e.g., a vehicle-in-need, a first vehicle) to be refueled. The vehicle 104 includes a fuel tank 106 that stores fuel (e.g., gasoline, diesel, etc.) to be used by the vehicle 104. The driver 102 may or may not be the owner of the vehicle 104. The driver 102 may desire to have the vehicle 104 filled with fuel without having to go to a gas station. For example, the driver 102 may be busy or may simply not want to go to the gas station. As such, the driver 102 may request and schedule a V2V refueling operation (described in further detail herein). A service operator 108 drives a refueling vehicle 110 (e.g., a second vehicle) to meet the vehicle 104 (e.g., in a parking lot) and performs the V2V refueling operation. The refueling vehicle 110 includes a fuel tank 112, a pump hose 114 and a pump handle 116. The pump hose 114 and the pump handle 116 may be similar to the hose and pump handle at a gas station, for example.

In the illustrated example, the refueling vehicle 110 includes a ground cable 118 (e.g., a ground wire or connection) that is to be connected between the vehicle 104 and the refueling vehicle 110 to electrically couple the vehicles 104, 110. In some examples, one end of the ground cable 118 is permanently attached (e.g., electrically coupled) to the refueling vehicle 110, and the other end of the ground cable 118 can be connected or disconnected from a vehicle-in-need (e.g., the vehicle 104) as desired. In the illustrated example, the ground cable 118 includes a first connector 120, and the vehicle 104 includes a second connector 122. The first connector 120 is to be plugged into the second connector 122 to electrically couple the vehicles 104, 110. In other examples, the ground cable 118 is not initially coupled to the refueling vehicle 110. In such an example, the opposite end of the ground cable 118 is to be coupled to the refueling vehicle 110.

In the illustrated example, the second connector 122 is disposed on a side of the vehicle 104 adjacent a fuel door 124. In other examples, the second connector 122 may be disposed in another location (e.g., behind the fuel door 124, on a rear side of the vehicle 104, etc.). In the illustrated example, the fuel door 124 opens to expose an inlet nozzle of a filler neck for the fuel tank 106.

Upon arriving at the vehicle 104, the service operator 108 is to connect the ground cable 118 to the vehicle 104 (e.g., by plugging the first connector 120 into the second connector 122 on the vehicle 104). The service operator 108 then opens the fuel door 124 on the vehicle 104, inserts a nozzle of the pump handle 116 into the inlet nozzle of the filler neck of the fuel tank 106, and pumps fuel from the fuel tank 112 of the refueling vehicle 110 into the fuel tank 106 of the vehicle 104. In some examples, a fuel cap (e.g., a threaded cap) is coupled to the inlet nozzle of the filler neck, and the service operator 108 also removes the fuel cap. By electrically coupling the vehicles 104, 110 with the ground cable 118, any electrostatic potential built up prior to or during the fueling process (e.g., from triboelectric charging) is dissipated (e.g., neutralized, balanced, equalized, etc.) between the two vehicles 104, 110, thereby eliminating or substantially reducing any charge differential that my cause a spark.

In the illustrated example, the vehicle 104 includes a telecommunications control unit (TCU) 126, a database 128, a power-train control module (PCM) 130 and a grounding circuit 132. The TCU 126 provides connection to a cellular network to transfer data between the vehicle 104 and a network 134. In some examples, the TCU 126 communicates with the network 134 through a protected network (e.g., a private network) operated by the manufacturer of the vehicle 104 (or another entity) to guarantee the privacy and capacity of the various telematic functions. The PCM 130 is a controller or control module (sometimes referred to as an Engine Control Unit (ECU)) that may control and monitor various aspects of the vehicle 104, such as the engine.

In the illustrated example, the system 100 includes a fuel delivery system 136 to arrange and/or schedule a V2V refueling operation between vehicles-in-need and refueling vehicles. The fuel delivery system 136 may be implemented using a server operating one or more applications or programs. In the illustrated example, the driver 102 communicates with the fuel delivery system 136 using a driver device 138, and the service operator 108 communicates with the fuel delivery system 136 using a service operator device 140. The example network 134 of the illustrated example of FIG. 1 is the Internet. However, the example network 134 may be implemented using any suitable wired and/or wireless network(s) including, for example, one or more data buses, one or more Local Area Networks (LANs), one or more wireless LANs, one or more cellular networks, one or more private networks, one or more public networks, etc. The example network 134 enables the fuel delivery system 136 to be in communication with the vehicle 104, the driver device 138 and the service operator device 140. As used herein, the phrase "in communication," including variants thereof, encompasses direct communication and/or indirect communication through one or more intermediary components and does not require direct physical (e.g., wired) communication and/or constant communication, but rather includes selective communication at periodic or aperiodic intervals, as well as one-time events.

In the illustrated example of FIG. 1, the driver device 138 is a mobile smart phone. However, the driver device 138 may be any electronic device, such as a computer (e.g., a desktop computer, a portable computer or laptop), a hand-held device (e.g., a smartphone, a tablet, etc.), a wearable device (e.g., a smart-watch), an infotainment system in the vehicle 104 and/or any other electronic device having a display and a processor. Similarly, in the illustrated example, the service operator device 140 is a mobile smart phone, but in other examples may include other electronic devices, such as a computer, a hand-held device, a wearable device, an infotainment system in the refueling vehicle 110 and/or any other electronic device having a display and a processor.

In the illustrated example, the fuel delivery system 136 includes a fuel request parser 142 that receives request messages from vehicles-in-need and parses the requests. For example, the driver 102 may transmit a request message to the fuel delivery system 136 via the driver device 138. Additionally or alternatively, the driver 102 may request a V2V refueling operation by calling the fuel delivery system 136 or visiting the site of the fuel delivery system 136 in person. The request may include, for example, a current location of the vehicle 104 and/or where the vehicle 104 is going to be located during the desired V2V refueling operation, a desired day for performing the V2V refueling operation, a desired time or time range (e.g., 10:00 am-11:00 am), etc. A fuel request scheduler 144 receives the request and schedules a refueling operation to be performed by a refueling vehicle and service operator, such as the refueling vehicle 110 and the service operator 108. The fuel delivery system 136 includes a messenger 146 (e.g., an interface) to communicate with the driver device 138 and/or the service operator device 140. Once a V2V refueling operation is scheduled, the messenger 146 may transmit a confirmation message to the driver device 138 and transmit the V2V refueling operation information to the service operator device 140. In other examples, the service operator 108 may be informed of the scheduled V2V refueling operation in another manner (e.g., by receiving a phone call from the fuel delivery system 136, by directly hearing the request at the service operator's office, etc.). In some examples, the V2V refueling operation information is saved in a database 148. The V2V refueling operation information may include, for example, the location of the vehicle 104, the time or time range in which the V2V refueling operation is to occur, and/or other corresponding details of the scheduled V2V refueling operation.

Once a V2V refueling operation is scheduled, the fuel delivery system 136 transmits the V2V refueling operation information to the vehicle 104 over the network 134. In the illustrated example, the fuel delivery system 136 includes a vehicle interface 150 to communicate with the TCU 126 of the vehicle 104. The vehicle 104 receives the message (e.g., via the TCU 126) and stores the V2V refueling operation information (e.g., the time of the scheduled V2V refueling operation) in the database 128. In other examples, the driver device 138 may communicate the V2V refueling operation information to the vehicle 104 (e.g., via a Bluetooth® transceiver in the vehicle 104).

Once the V2V refueling operation is scheduled, the service operator 108 navigates the refueling vehicle 110 to the location of the vehicle 104 and performs the V2V refueling operation. However, in some instances, the service operator 108 may fail to connect the ground cable 118 to the vehicle 104 prior to commencing the V2V refueling operation. As a result, a dangerous electrostatic potential could be created by the flow of liquid fuel into the fuel tank 106 of the vehicle 104. As discussed in further detail herein, if the PCM 130 determines the ground cable 118 is not connected between the vehicles 104, 110 (i.e., the vehicles are not electrically coupled), the PCM 130 performs one or more operations to prevent or substantially impede the refueling process. In some examples, the PCM 130 determines whether the vehicles 104, 110 are electrically coupled based on a signal from the grounding circuit 132. For example, if the ground cable 118 is connected to the vehicle 104 (i.e., the vehicles 104, 110 are properly electrically coupled), the grounding circuit 132 transmits a signal to the PCM 130. In such an instance, the PCM 130 allows refueling to proceed in a normal manner. Otherwise, if the ground cable 118 is not connected to the vehicle 104 (i.e., the vehicle 104, 110 are not properly electrically coupled), the grounding circuit 132 does not produce a signal, and the PCM 130 determines the vehicles 104, 110 are not properly electrically coupled. In such an instance, the PCM 130 performs one or more operations that prevents the service operator 108 from dispensing fuel or significantly reduces the speed at which the service operator 108 can dispense fuel.

Figure 2:
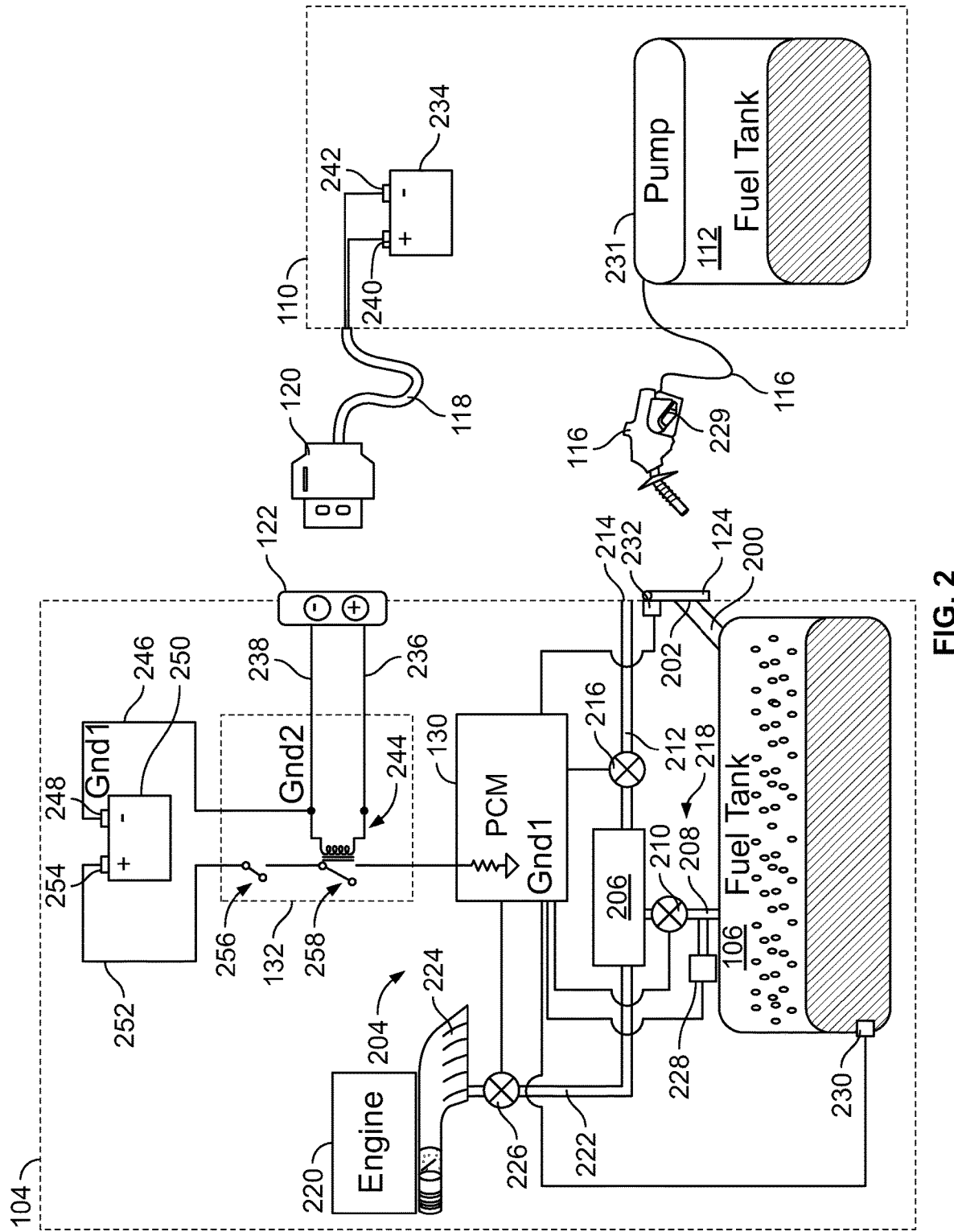
FIG. 2 is a schematic diagram of the example vehicle and the example refueling vehicle of the example system of FIG. 1 prior to performing the example V2V refueling operation.

FIG. 2 is an example schematic diagram of the vehicle 104 and the refueling vehicle 110 of FIG. 1. The vehicle 104 includes the fuel tank 106 to store fuel. A filler neck 200 (e.g., a filler pipe, an inlet tube, etc.) fluidly connects the fuel tank 106 to a side of the vehicle 104. The filler neck 200 includes an inlet nozzle 202 (e.g., an opening) in which the pump handle 116 can be inserted to refuel the fuel tank 106. In the illustrated example, the fuel door 124 covers the inlet nozzle 202 of the filler neck 200. In some examples, a fuel cap (e.g., a threaded cap) is removably coupled to the inlet nozzle 202.

The example vehicle 104 includes an Evaporative Emission Control (EVAP) system 204 that provides a vent for the fuel tank 106 and prevents harmful fuel vapors from escaping into the atmosphere. In the illustrated example, the EVAP system 204 includes a charcoal canister 206 (e.g., a vapor canister). A first passageway 208 (e.g., tube, a conduit, etc.) fluidly couples the fuel tank 106 to the charcoal canister 206. In the illustrated example, a vapor bypass valve (VBV) 210 is coupled to the first passageway 208 between the fuel tank 106 and the charcoal canister 206. The VBV 210 operates between an open position to allow air flow through the first passageway 208 between the fuel tank 106 and the charcoal canister 206 and a closed position to prevent air flow through the first passageway 208 between the fuel tank 106 and the charcoal canister 206.

In the illustrated example of FIG. 2, a second passageway 212 fluidly couples the charcoal canister 206 to the outside of the vehicle 104. In particular, an outlet 214 of the second passageway 212 is vented to the atmosphere. In the illustrated example, a canister vent shut (CVS) valve 216 is coupled to the second passageway 212 between the charcoal canister 206 and the outlet 214 of the second passageway 212. The CVS valve 216 operates between an open position to allow air flow through the second passageway 212 between the charcoal canister 206 and the outlet 214 and a closed position to prevent air flow through the second passageway 212 between the charcoal canister 206 and the outlet 214. In the illustrated example, the first passageway 208 and the second passage 212 form a vent passageway 218 for the fuel tank 106 that vents the fuel tank 106 to the atmosphere. While in the illustrated example both the VBV 210 and the CVS valve 216 are coupled to the vent passageway 218 to block or allow air flow, in other examples only one of the valves may be implemented. In other examples, more than two valves may be implemented.

In general, when the vehicle 104 is not running, the VBV 210 and the CVS valve 216 are in the open position. As such, air from the fuel tank 106 can travel through the vent passageway 218 and out into the atmosphere. In particular, fuel vapors from the fuel tank 106 travel through the first passageway 208 and into the charcoal canister 206. The charcoal canister 206 captures potentially harmful fumes or vapors (e.g., volatile organic compounds) from the fuel tank 106 (and/or from an engine 220) and prevents those vapors from being released into the atmosphere. In some examples, the charcoal canister 206 contains charcoal pellets that absorb the harmful vapors emanating from the fuel tank 106 and temporarily stores the vapors in the charcoal canister 206. Thus, vapors and fumes from the fuel tank 106 are scrubbed in the charcoal canister 206 and the scrubbed air is vented to the atmosphere (e.g., via the outlet 214 of the second passageway 212).

Additionally, with the VBV 210 and the CVS valve 216 open, any changes in air pressure in the fuel tank 106 can be stabilized. For example, an increase in fuel temperature creates an increased vapor pressure in the fuel tank 106, which can be exhausted through the vent passageway 218. Similarly, when adding fuel to the fuel tank 106 (e.g., at a gas station), the displaced air in the fuel tank 106 (e.g., air that is displaced by the volume of fuel) is pushed through the vent passageway 218 out into the atmosphere. Conversely, a decrease in temperature of the fuel (or a reduction in the level of fuel) creates a negative pressure (e.g., a vacuum) in the fuel tank 106. In such an instance, displacement air is drawn through the vent passageway 218 and into the fuel tank 106 in the opposite direction.

In the illustrated example, the vehicle 104 includes the engine 220. When the engine 220 is started and/or running, the vapors stored in the charcoal canister 206 can be burned in the engine 220. In particular, a third passageway 222 fluidly couples the charcoal canister 206 to an intake manifold 224 of the engine 220. In the illustrated example, a canister purge valve (CPV) 226 is coupled to the third passageway 222 between the charcoal canister 206 and the intake manifold 224. The CPV 226 operates between an open position to allow air flow through the third passageway 222 between the charcoal canister 206 and the intake manifold 224 and a closed position to prevent air flow through the third passageway 222 between the charcoal canister 206 and the intake manifold 224. When the engine 220 is started and/or running, the CPV 226 and the CVS valve 216 are opened and the VBV 210 is closed. The negative pressure (i.e., vacuum) generated in the intake manifold 224 draws atmospheric air through the second passage 212, through the charcoal canister 206, and through the third passageway 222 to the intake manifold 224, thereby purging the vapors from the charcoal canister 206 and burning the vapors in the engine 220.

In the illustrated example, the VBV 210, the CVS valve 216 and the CPV 226 are communicatively coupled to the PCM 130. The PCM 130 controls the operations of the VBV 210, the CVS valve 216 and the CPV 226, by instructing (e.g., via control signals) the VBV 210, the CVS valve 216 and the CPV 226 to open or close. The VBV 210, the CVS valve 216 and the CPV 226 may be implemented by any type of valve(s) suitable for opening and closing the respective passageways. In the illustrated example, a fuel tank pressure transducer (FTPT) 228 (e.g., a pressure sensor) is coupled to the first passageway 208 to measure a pressure in the fuel tank 106. Additionally, a fuel level sensor 230 is disposed in the fuel tank 106 to measure a level of fuel in the fuel tank 106. The FTPT 228 and the fuel level sensor 230 are communicatively coupled to the PCM 130 and transmit measurements (e.g., sensor outputs) to the PCM 130.

In the illustrated example, the refueling vehicle 110 includes the fuel tank 112, the pump hose 114 and the pump handle 116. The pump handle 116 includes a trigger 229 that activates a pump 231 to dispense fuel from the pump handle 116. In the illustrated example, the pump handle 116 and the trigger 229 operate substantially similarly to the pump handle at a gas station. In particular, the pump handle 116 includes a sensing port (e.g., a venturi port) that enables the pump 231 to remain on as long as the sensing port is exposed to a negative pressure. If fuel covers the sensing port (e.g., when the fuel tank 106 is full) or back pressure acts on the sensing port, the trigger 229 is deactivated that the pump 231 is shutoff.

To prevent or reduce the ability to add fuel to the fuel tank 106 during a V2V refueling operation without first connecting the ground cable 118 (which would otherwise create the risk of an electrostatic potential), the PCM 130 monitors for the ground cable 118 and performs one or more operations if the ground cable 118 is not connected. For example, the PCM 130 is aware that a V2V refueling operation is scheduled to occur at a certain time or during a certain time period (e.g., between 10:00 am and 11:00 am) based on the V2V refueling operation information stored in the database 128 (FIG. 1). At or during this time period, the PCM 130 monitors for a signal indicating that the refueling operation is about to occur, at which point the PCM 130 is armed (e.g., awakened, operated in a standby mode). In some examples, the PCM 130 is armed when the fuel door 124 is opened, which is indicative that refueling is about to occur. In the illustrated example, a fuel door sensor 232 detects whether the fuel door 124 is opened or closed. When the fuel door 124 is opened, the PCM 130 determines that fuel is about to be added to the fuel tank 106 and the PCM 130 is armed. In other examples, the PCM 130 may be armed automatically during the scheduled time or time range in which the V2V refueling operation is to occur. Once the PCM 130 is armed (e.g., in the standby mode), the PCM 130 monitors to determine whether fuel is being added to the fuel tank 106 and performs one or more operations to prevent refueling if the vehicles 104, 110 are not properly electrically coupled. For example, if the PCM 130 determines that fuel is being added to the fuel tank 106 and the ground cable 118 is not connected to the vehicle 104, the PCM 130 closes the CVS valve 216, which prevents or impedes refueling, as discussed in further detail in conjunction with FIG. 3. In some examples, the PCM 130 detects fueling based on an instantaneous change in the fuel level as measured by the fuel level sensor 230. In other examples, the PCM 130 may determine fuel is being added based on other measurements, such as a change in pressure in the fuel tank 106 as measured by the FTPT 228. Otherwise, if the ground cable 118 is connected to the vehicle 104 (i.e., the vehicles 104, 110 are electrically coupled), and the PCM 130 detects that fuel is being added to the fuel tank 106, the PCM 130 allows the CVS valve 216 to remain open (and/or otherwise opens the CVS valve 216), thereby allowing refueling in a normal manner, as discussed in further detail in conjunction with FIG. 4.

In other examples, the PCM 130 may be armed based on another indicator. As described above, when the PCM 130 is armed, the PCM 130 operates to prevent refueling unless the ground cable 118 is connected. Otherwise, if the PCM 130 is not armed, the vehicle 104 may operate normally. For example, the PCM 130 may be armed when the refueling vehicle 110 is within a predetermined distance of the vehicle 104 (e.g., based Global Positioning System (GPS) coordinates). In another example, the service operator device 140 and/or the refueling vehicle 110 may transmit a message to the vehicle 104 when the V2V refueling operation is about to begin, and the PCM 130 may be armed. In another example, the PCM 130 may be armed when a fuel cap is removed from the inlet nozzle 202.

To determine whether the ground cable 118 is connected between the vehicles 104, 110, the PCM 130 monitors for a signal from the grounding circuit 132. In the illustrated example of FIG. 2, the ground cable 118 is electrically coupled to a battery 234 of the refueling vehicle 110. The first connector 120 of the ground cable 118 is to be plugged into the second connector 122 of the vehicle 104 to electrically couple the vehicles 104, 110. In some examples, the first connector 120 is a female connector and the second connector 122 is a male connector, or vice versa. In other examples, other types of connectors may be implemented.

In the illustrated example of FIG. 2, the grounding circuit 132 includes a first positive electrical connection or path 236 (e.g., a current path, an electrical connection, a wire, a lead, etc.) and a first negative electrical connection or path 238. When the first connector 120 is connected to the second connector 122, the first positive electrical path 236 is electrically coupled to a positive terminal 240 of the battery 234 and the first negative electrical path 238 is electrically coupled to a negative terminal 242 of the battery 234. In the illustrated example, the first positive electrical path 236 and the first negative electrical path 238 are electrically connected to a relay 244.

In the illustrated example of FIG. 2, the grounding circuit 132 includes a second negative electrical connection or path 246 between the first negative electrical path 238 and a negative terminal 248 of a battery 250 of the vehicle 104. The ground circuit 132 also includes a second positive electrical connection or path 252 between a positive terminal 254 of the battery 250 and the PCM 130. In the illustrated example, the second positive electrical path 252 includes a fuel door switch 256. When the fuel door 124 is opened (e.g., as sensed by the fuel door sensor 232), the fuel door switch 256 is closed, which creates a closed electrical path along the second positive electrical path 252. Conversely, when the fuel door 124 is closed, the fuel door switch 256 is opened, which creates an opening or break in the second positive electrical path 252.

In the illustrated example, the relay 244 includes a grounding switch 258 in the second positive electrical path 252. When the relay 244 is energized, the grounding switch 258 is closed, which creates a closed electrical path along the second positive electrical path 252 (e.g., the grounding circuit 132 is closed), and when the relay 244 is not energized (as illustrated in the position in FIG. 2), the grounding switch 258 is opened, which creates an opening or break in the second positive electrical path 252 (e.g., the grounding circuit 132 is open). To energize the relay 244, the first connector 120 is to be connected to the second connector 122, which electrically couples the battery 234 of the refueling vehicle 110 and the battery 250 of the vehicle 104 in series with the relay 244. In some examples, the relay 244 requires energy from both batteries 234, 250 to be energized (e.g., a 24V relay). Therefore, in some examples, electrical power from both of the batteries 234, 250 is needed to energize the relay 244, thereby ensuring both of the vehicles 104, 110 are properly electrically coupled.

When the first connector 120 is connected to the second connector 122, the ground cable 118 is connected between and electrically couples the vehicles 104, 110, and the relay 244 is energized. When the first connector 120 is not connected to the second connector 122, the ground cable 118 is not connected between the vehicles 104, 110 and the vehicles 104, 110 are not electrically coupled, and the relay 244 is not energized. When the first connector 120 is connected to the second connector 122, the battery 234 and the battery 250 are electrically coupled in series with the relay 244, which energizes the relay 244, thereby closing the grounding switch 258. When the fuel door switch 256 and the grounding switch 258 are closed, a signal (e.g., an input signal, a voltage signal) is generated at or otherwise provided to the PCM 130. In particular, the grounding circuit 132 is completed or closed, which generates a signal in the PCM 130. The signal indicates the refueling vehicle 110 and the vehicle 104 are electrically coupled (e.g., it is safe to perform the V2V refueling operation). Therefore, when the PCM 130 detects this generated signal, the PCM 130 determines that the ground cable 118 is connected to the vehicle 104 and the PCM 130 allows (or instructs) the CVS valve 216 to remain open during refueling, which enables the displaced air to be vented through the vent passageway 218, as described in conjunction with FIG. 4 below. Otherwise, if the PCM 130 does not detect a signal from the grounding circuit 132, the PCM 130 determines the ground cable 118 has not been connected to the vehicle 104, and the PCM 130 instructs the CVS valve 216 to close, as described in conjunction with FIG. 3 below.

Figure 3:
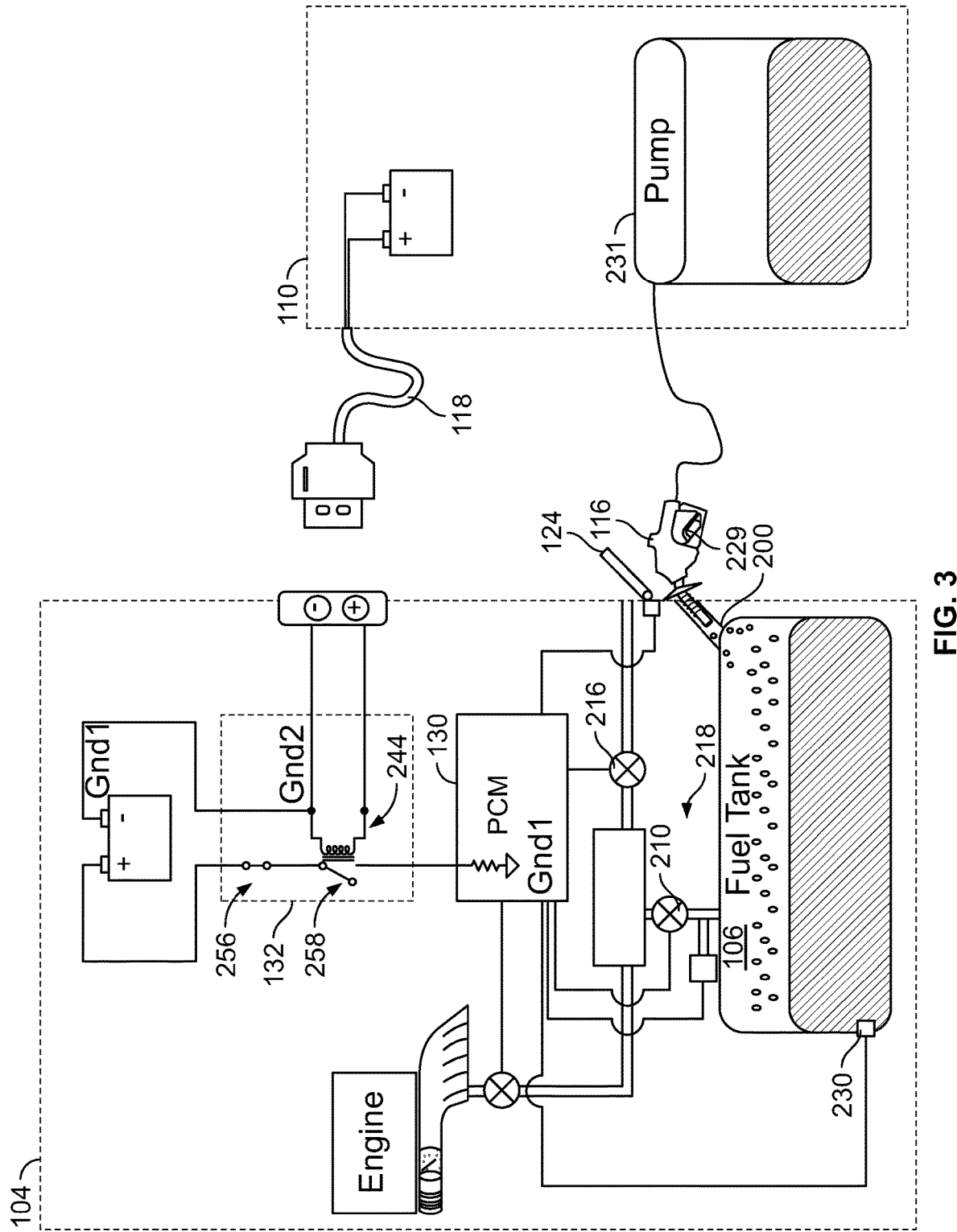
FIG. 3 shows the schematic diagram of FIG. 2 when the example vehicle and the example refueling vehicle are not electrically coupled during the example V2V refueling operation.

FIG. 3 illustrates when the vehicles 104, 110 are not electrically coupled and the service operator 108 (FIG. 1) attempts to refuel the vehicle 104. When the service operator 108 opens the fuel door 124, the fuel door switch 256 in the grounding circuit 132 closes and the PCM 130 is armed. However, if the service operator 108 does not connect the ground cable 118 to the vehicle 104 (e.g., by plugging the first connector 120 into the second connector 122), the relay 244 is not energized and the grounding switch 258 remains open. Therefore, the grounding circuit 132 is not closed (or completed) and no signal is generated at the PCM 130. In the armed mode, the PCM 130 monitors for fueling (e.g., via the fuel level sensor 230). If the PCM 130 determines that fuel is being added into the fuel tank 106 (e.g., based on a change in fuel level) and the vehicles 104, 110 are not electrically coupled (e.g., as determined by lack of a signal from the grounding circuit 132), the PCM 130 instructs the CVS valve 216 to close. Therefore, when fuel is added to the fuel tank 106, the displaced air in the fuel tank 106 cannot travel through the vent passageway 218 to be vented to the atmosphere. Instead, the displaced air in the fuel tank 106 is forced back up through the filler neck 200, which shuts off the pump 231. In particular, the back flow of air up the filler neck 200 chokes the sensing port in the pump handle 116, which deactivates the trigger 229 and shuts off the pump 231. This is similar to how a pump handle at a gas station operates.

Once the pump 231 is deactivated, the service operator 108 (FIG. 1) can release and reapply the trigger 229 of the pump handle 116 to retry fueling. However, the same effect occurs, and the pump 231 is shutoff after a short period of time. Thus, the risk of charge build-up is prevented. Otherwise, the service operator 108 may continue to pump fuel, but at a relatively slow rate such that the displaced air venting through the filler neck 200 does not trigger the sensing port in the pump handle 116. At such a slow rate, the risk of electrostatic potential is significantly reduced or eliminated. In some examples, this effect serves as a reminder to the service operator 108 to connect the ground cable 118. In some examples, in addition to or as an alternative to closing the CVS valve 216, the PCM 130 closes the VBV 210, which also blocks the air flow through the vent passageway 218.

In some examples, if fueling is detected and the ground cable 118 is not connected, a reminder message (e.g., an alert) may be sent to the service operator device 140 (FIG. 1) to remind the service operator 108 (FIG. 1) to connect the ground cable 118. For example, referring back to FIG. 1, the TCU 126 may transmit a message to the fuel delivery system 136, which transmits (e.g., via the messenger 146) a reminder message to the service operator device 140. Additionally or alternatively, a reminder message may be sent directly from the vehicle 104 to the service operator device 140 (e.g., via a Bluetooth® transceiver in the vehicle 104). In other examples, other indicators may be used to alert the service operator 108 to connect the ground cable 118, such as an audible alarm or a flashing light.

In some examples, the CVS valve 216 is only closed once fueling is detected to prevent a premature sealing of the fuel tank 106. In some instances, the fuel tank 106 may be constructed of relatively weak material (e.g., plastic) that may not be able to hold significant pressure changes (e.g., due to changes in temperature). If the CVS valve 216 is closed, changes in temperature of the fuel can cause pressure changes in the fuel tank 106, which could affect the structural integrity of the fuel tank 106. Therefore, instead of prematurely closing the CVS valve 216 (e.g., for an extended period of time before fueling even starts), the PCM 130 waits till the fueling commences. However, in other examples, the PCM 130 may instruct the CVS valve 216 to close at the start of the scheduled V2V refueling operation time, and may only be opened once the ground cable 118 is connected.

Figure 4:
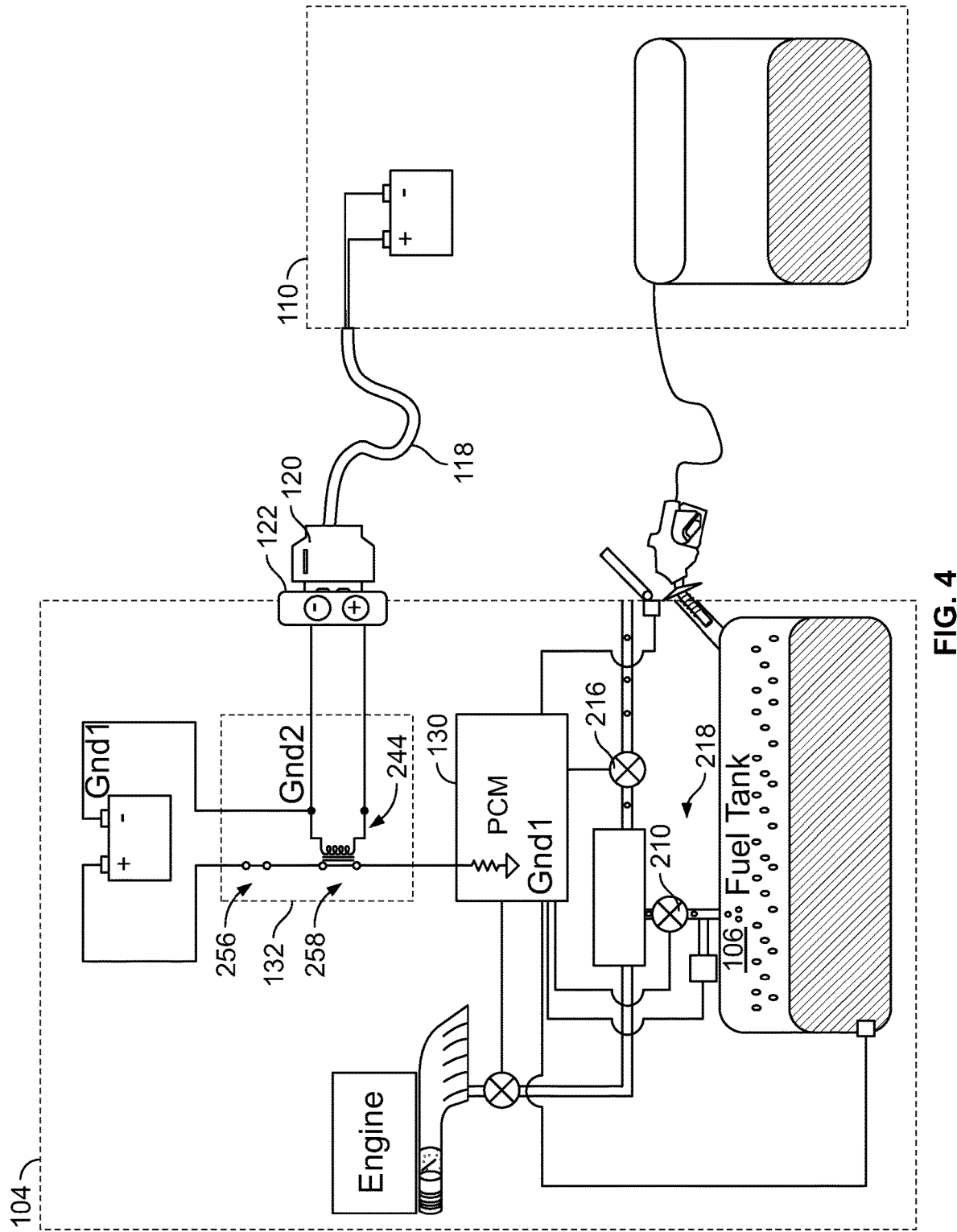
FIG. 4 shows the schematic diagram of FIG. 2 when the example vehicle and the example refueling vehicle are electrically coupled during the example V2V refueling operation.

FIG. 4 illustrates when the ground cable 118 is connected to the vehicle 104 and the vehicles 104, 110 are electrically coupled. As illustrated in FIG. 4, if the ground cable 118 is connected to the vehicle 104 (e.g., by plugging the first connector 120 into the second connector 122), the relay 244 is energized, which closes the grounding switch 258. As a result, the grounding circuit 132 transmits a signal to the PCM 130, thereby indicating the vehicles 104, 110 are electrically coupled. Therefore, if the PCM 130 determines fuel is being added to the fuel tank 106, the PCM 130 allows the CVS valve 216 to remain open (or, in the case that the CVS valve 216 was previously closed, instructs the CVS valve 216 to reopen). Thus, when dispensing fuel into the fuel tank 106, displaced air from the fuel tank 106 is pushed through the vent passageway 218 outside of the vehicle 104, similar to the flow path when fueling at a gas station. In addition to or as an alternative to controlling the CVS valve 216, the PCM 130 may similarly control the VBV 210 to prevent or allow gas flow through the vent passageway 218.

While in the illustrated example of FIGS. 2-4 the fuel door switch 256 is implemented in the ground circuit 132, in other examples, no fuel door switch is used. Instead, the grounding circuit 132 may be completed or closed based only on the connection of the ground cable 118 between the vehicles 104, 110. However, in some examples, having the fuel door switch 256 provides an added level of security.

Figure 5:
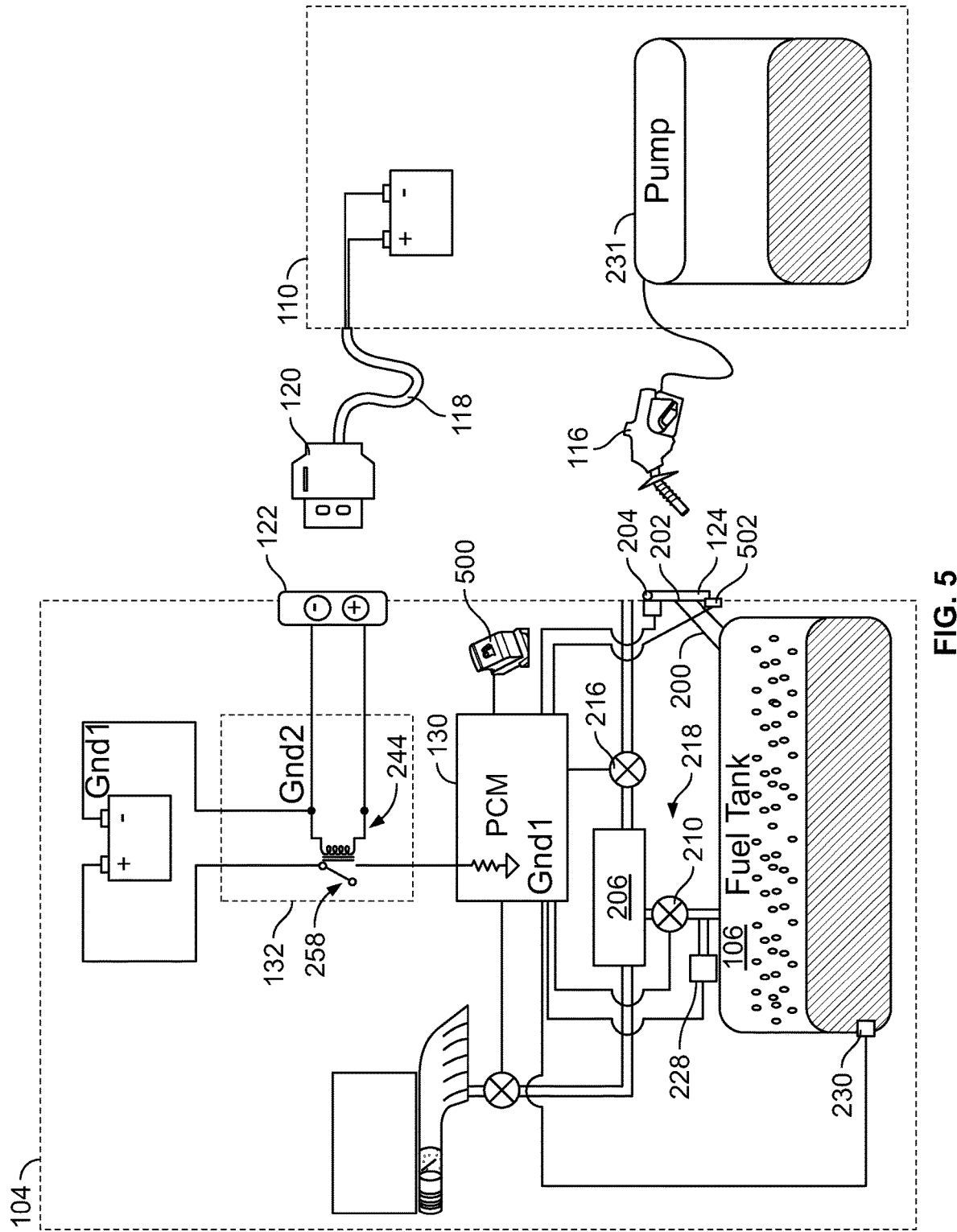
FIG. 5 is a schematic diagram of the example vehicle and the example refueling vehicle of the example system of FIG. 1 in which the example vehicle has a locked fuel door.

FIG. 5 is another schematic diagram of the vehicle 104 and the vehicle 110 of the example system 100 of FIG. 1. In the illustrated example of FIG. 5, the vehicle 104 has a lockable fuel door. Those components of the example vehicle 104 that are substantially similar or identical to the components of the example vehicle 104 described above and that have functions substantially similar or identical to the functions of those components will not be described in detail again below. Instead, the interested reader is referred to the above corresponding descriptions. To facilitate this process, similar reference numbers will be used for like structures.

In the illustrated example of FIG. 5, the vehicle 104 is implemented as a plug-in hybrid electric vehicle (PHEV). A PHEV is a hybrid electric vehicle that uses a rechargeable battery, or another energy storage device, in addition to a gas engine (e.g., an internal combustion engine). Therefore, if the vehicle 104 is implemented as a PHEV, an electric motor may be included in the vehicle 104 in addition to the engine 220. Some vehicles, such PHEVs, have sealed fuel tanks to trap vapor from diurnal temperature changes. For instance, because the engine 220 may rarely be used, the fuel tank 106 is sealed to trap vapors in the fuel tank 106. In particular, the VBV 210 (which may be implemented as a fuel tank isolation valve (FTIV)) is normally in the closed position. Otherwise, the charcoal canister 206 would be overloaded by vapors during long exposure and no purging. Therefore, the fuel tank 106 holds pressure when the temperature of the fuel increases (e.g., such as during the day-time hours) and holds a vacuum (e.g., such as during night-time hours).

Before refueling the vehicle 104 of FIG. 5 (e.g., at a gas station or via a V2V refueling operation), the pressure in the fuel tank 106 is to be stabilized with the atmospheric pressure. Otherwise, opening the fuel tank 106 may cause fuel and/or vapor to spray from the inlet nozzle 202. To prevent opening of the fuel tank 106, the fuel door 124 of the example vehicle 104 of FIG. 5 is locked, which prevents a person from accessing the inlet nozzle 202 until the fuel tank 106 is depressurized. When a person intends to refuel the vehicle 104 at a gas station, for example, a refuel request switch 500 (e.g., a button) is activated (e.g., depressed). In some examples, the refuel request switch 500 is located in the cabin of the vehicle 104. When the refuel request switch 500 is triggered, the PCM 130 opens the VBV 210 (and the CVS valve 216, if not already open) to depressurize the fuel tank 106 via the vent passageway 218. As mentioned above, failure to depressurize the fuel tank 106 could result in fuel being sprayed from the filler neck 200 when the fuel door 124 and/or a fuel cap is opened. Once the pressure in the fuel tank 106 is substantially equal to the atmospheric pressure (e.g., ±1 pound-per-square-inch (psi)) (as detected by the FTPT 228), the PCM 130 unlocks the fuel door 124, and the fuel tank 106 may be refueled. Once refueling is finished, the fuel door 124 is closed and locked and the VBV 210 is closed to trap vapors inside the fuel tank 106.

In the illustrated example of FIG. 5, the vehicle 104 includes a lock to lock or unlock the fuel door 124. In illustrated example, the lock is implemented as a solenoid actuated lock 502. In other examples, other types of locks may be used. The solenoid actuated lock 502 is controlled by the PCM 130, which causes (e.g., instructs) the solenoid actuated lock 502 (e.g., based on a control signal) to lock or unlock the fuel door 124. When the engine 220 is off (e.g., when the vehicle 104 is not operating or is operating in an electric mode), the VBV 210 is closed, thereby preventing vapors from the fuel tank 106 from venting to the atmosphere through the vent passageway 218. As mentioned above, if the fuel tank 106 was vented to atmosphere, the vapors over time would overload the charcoal canister 206 and escape to the atmosphere.

If the ground cable 118 is not connected to the vehicle 104, the PCM 130 does not receive a signal from grounding circuit 132. In particular, if the first connector 120 is not connected of the second connector 122, the relay 244 of the grounding circuit 132 is not energized and a signal is not generated in the PCM 130. As a result, the PCM 130 does not trigger the solenoid actuated lock 502 to unlock the fuel door 124. Thus, the service operator 108 (FIG. 1) cannot open the fuel door 124 to perform the refueling operation. This serves as a reminder to connect the ground cable 118, otherwise the service operator 108 (FIG. 1) may not be able to perform the V2V refueling operation (unless the service operator 108 or another person activates the refuel request switch 500 from inside the vehicle 104).

If the ground cable 118 is connected to the vehicle 104 (e.g., by plugging first connector 120 into second connector 122), the PCM 130 receives a signal from the grounding circuit 132. In particular, the relay 244 is energized, which closes the grounding switch 258. As a result, the grounding circuit 132 transmits a signal to the PCM 130, thereby indicating the vehicles 104, 110 are electrically coupled. Once the PCM 130 determines the vehicles 104, 110 are electrically coupled, the PCM 130 opens the VBV 210 (and the CVS valve 216 if not already open) to depressurize the fuel tank 106 via the vent passageway 218. The PCM 130 also opens (e.g., energizes) the solenoid actuated lock 502 to unlock the fuel door 124, which enables the service operator 108 (FIG. 1) to insert the pump handle 116 and dispense fuel.

In some examples, the PCM 130 does not trigger the solenoid actuated lock 502 to unlock the fuel door 124 until the fuel tank 106 is depressurized. For example, the PCM 130 may monitor the pressure of the fuel tank 106 using the FTPT 228. Once the PCM 130 determines the fuel tank 106 is depressurized (or otherwise substantially equal (e.g., ±1 psi) to atmospheric pressure), the PCM 130 triggers the solenoid actuated lock 502 to unlock the fuel door 124, thereby allowing the service operator 108 (FIG. 1) to add fuel to the fuel tank 106.

In some examples, the PCM 130 continues to monitor whether the vehicles 104, 110 are electrically coupled during the refueling process. For example, the PCM 130 may continue to determine whether a signal is received from the grounding circuit 132. If the PCM 130 determines that the ground cable 118 has been unplugged (e.g., by sensing a lack of signal from the grounding circuit 132), the PCM 130 may close the VBV 210 and/or the CVS valve 216, which triggers a shutoff of the pump 231 as described above in connection with FIG. 3. Otherwise, if the ground cable 118 remains connected between the vehicles 104, 110, the PCM 130 instructs or allows the VBV 210 and/or the CVS valve 216 to remain open. Once the V2V refueling operation is complete, the service operator 108 (FIG. 1) closes the fuel door 124 and the PCM 130 instructs the solenoid actuated lock 502 to lock the fuel door 124. The PCM 130 may also instruct the VBV 210 and/or the CVS valve 216 to close.

While in the illustrated examples of FIGS. 2-5 a signal is generated by the grounding circuit 132 when the ground cable 118 is connected between vehicles 104, 110, in other examples, the grounding circuit 132 may operate in reverse. For example, the grounding switch 258 may be normally closed and a signal may be generated by the grounding circuit 132 while the vehicles 104, 110 are not electrically coupled. Then, when the ground cable 118 is connected between the vehicles 104, 110, the grounding circuit 132 stops generating a signal, which indicates the vehicles 104, 110 are properly electrically coupled. Alternatively, the grounding circuit 132 may provide a first signal to the PCM 130 when the vehicles 104, 110 are not properly electrically coupled and a second signal to the PCM 130 when the vehicles 104, 110 are properly electrically coupled. In other examples, the grounding circuit 132 may be incorporated into the refueling vehicle 110. If the vehicles 104, 110 are not electrically coupled during the V2V refueling operation, the pump 231 may be deactivated, or the refueling vehicle 110 may transmit a signal to the vehicle 104 to the CVS 216 and/or the VBV 210.

In some examples, the PCM 130 may also prevent refueling while the vehicle 104 is running. For example, the PCM 130 may determine whether the engine 200 is running while fuel is being added to the fuel tank 104. Even if the vehicles are electrically coupled (e.g., via the ground cable 118), the PCM 130 may cause the CVS 216 and/or the VBV 210 to close to prevent refueling. In another example, the PCM 130 may cause the solenoid actuated lock 502 (FIG. 5) to remain in the locked position while the vehicle 104 is running.

While in the illustrated examples the V2V refueling operation is scheduled by the fuel delivery system 136 (FIG. 1), in other examples, other system(s) may be used to arrange or schedule a V2V refueling operation. In other words, the PCM 130 may operate substantially the same as disclosed herein using information about a V2V refueling operation from another source. For example, the driver device 138 and/or the service operator device 140 may transmit the V2V refueling operation information to the vehicle 104, such that the vehicle 104 is aware a V2V refueling operation is scheduled to take place.

In the illustrated examples, the V2V refueling operation occurs between two vehicles (e.g., two cars). However, it is understood that the example methods, apparatus/systems and articles of manufacture disclosed herein may be applied to any other types refueling operations between two vehicles or structures, such as between a truck and an aircraft, between two aircraft, between a truck and a train, and/or any other application where one of the two vehicles or structures is not electrically grounded. The refueling vehicle (or structure) may be a motorized or non-motorized vehicle such as a trailer towed by a truck. The example grounding circuit 132 disclosed herein can be used as a check to determine whether the two structures are electrically coupled. Otherwise, an action may be taken to prevent refueling (e.g., locking a fuel door, closing a fuel tank vent valve, sounding an alarm, etc.).

While an example manner of implementing the vehicle 104 is illustrated in FIG. 1, one or more of the elements, processes and/or devices illustrated in FIG. 1 may be combined, divided, re-arranged, omitted, eliminated and/or implemented in any other way. Further, the example TCU 126, the example database 128, the example PCM 130 and/or the example grounding circuit 132 of the example vehicle 104 of FIG. 1 may be implemented by hardware, software, firmware and/or any combination of hardware, software and/or firmware. Thus, for example, any of the example TCU 126, the example database 128, the example PCM 130 and/or the example grounding circuit 132 of the example vehicle 104 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example TCU 126, the example database 128, the example PCM 130 and/or the example grounding circuit 132 is/are hereby expressly defined to include a tangible computer readable storage device or storage disk such as a memory, a digital versatile disk (DVD), a compact disk (CD), a Blu-ray disk, etc. storing the software and/or firmware. Further still, the example vehicle of FIG. 1 may include one or more elements, processes and/or devices in addition to, or instead of, those illustrated in FIG. 1, and/or may include more than one of any or all of the illustrated elements, processes and devices.

Figure 6:
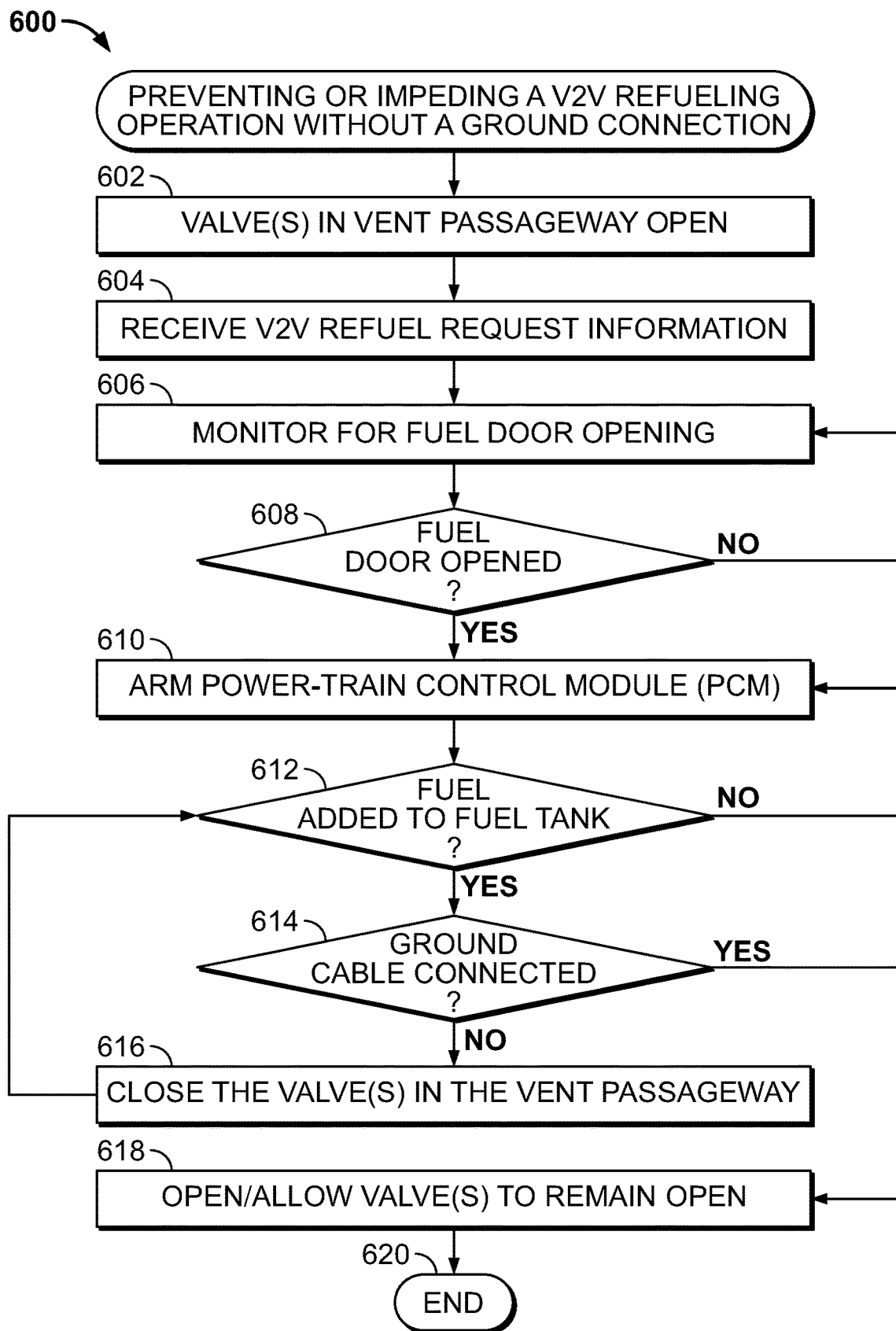
FIG. 6 is a flowchart illustrating an example method that may be implemented by the example vehicle of FIG. 1, and described in conjunction with FIGS. 2-4, to prevent or impede the example V2V refueling operation without a ground connection.
Figure 7:
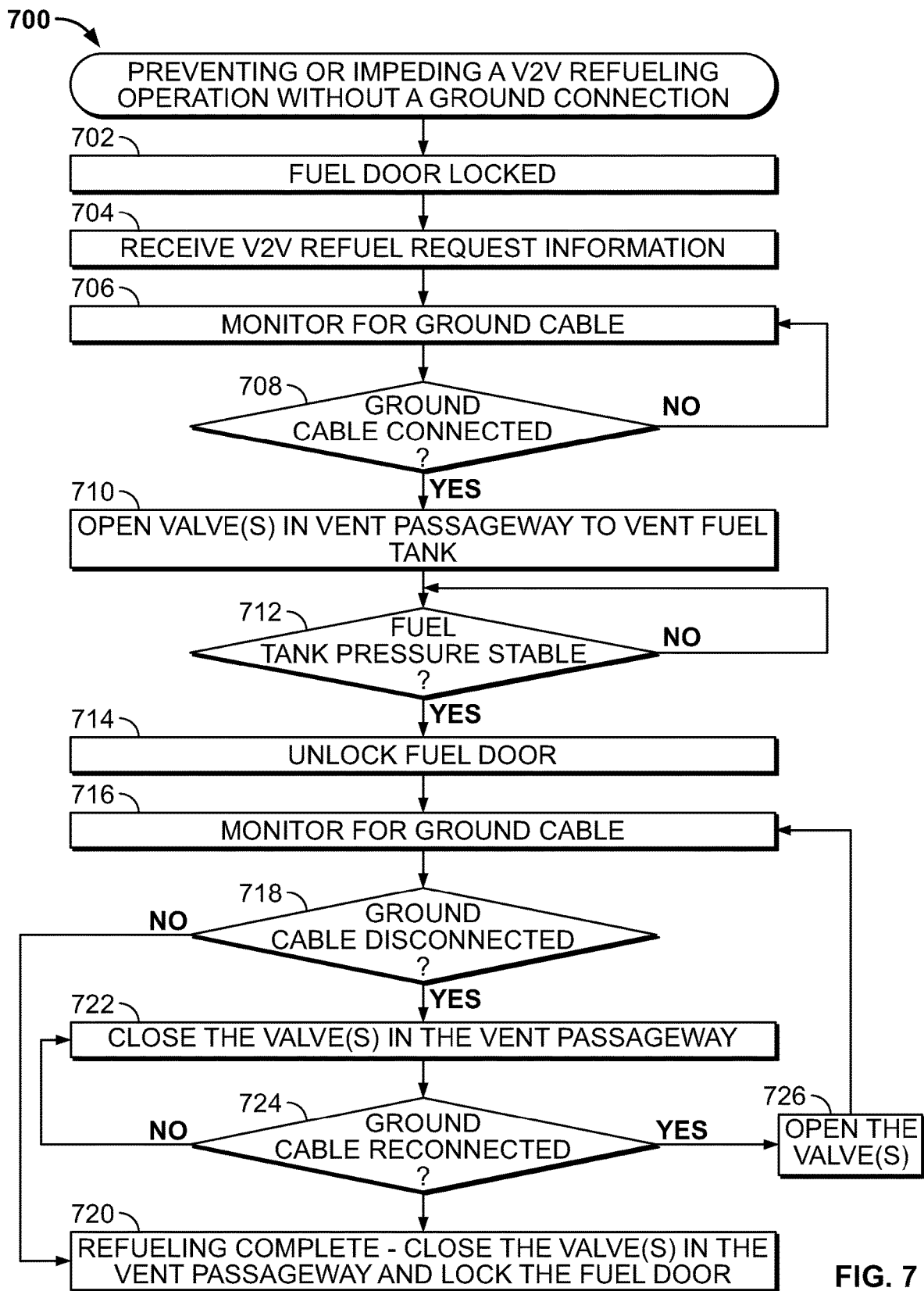
FIG. 7 is a flowchart illustrating an example method that may be implemented by the example vehicle of FIG. 1, and described in conjunction with FIG. 5, to prevent or impede the example V2V refueling operation without a ground connection.

Flowcharts representative of example methods for implementing the example vehicle 104 (and performed at least in part by the PCM 130) of FIG. 1 are shown in FIGS. 6 and 7. In these examples, the methods may be implemented by machine readable instructions that comprise a program for execution by a processor such as the processor 812 shown in the example processor platform 800 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 6 and 7, many other methods of implementing the example vehicle 104 (and performed at least in part by the PCM 130) may alternatively be used. For example, the order of execution of the blocks may be changed, and/or some of the blocks described may be changed, eliminated, or combined.

As mentioned above, the example methods of FIGS. 6 and 7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example methods of FIGS. 6 and 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 6 is a flowchart illustrating an example method 600 implemented by the vehicle 104 of FIG. 1 to prevent or impede a V2V refueling operation without a ground connection. The method 600 of FIG. 6 may be performed at least in part by the PCM 130 and applies to a vehicle having a non-sealed or normally vented fuel tank, such as described in conjunction with FIGS. 2-4. The method 600 of FIG. 6 is describe in connection with FIGS. 2-4. At block 602, the VBV 210 and the CVS valve 216 are opened such that the vent passageway 218 is opened. As mentioned above, having the vent passageway 218 open enables vapor pressure in the fuel tank 106 to stabilize. Harmful vapors from the fuel tank 106 are scrubbed in the charcoal canister 206 and the scrubbed air is vented to atmosphere.

At block 604, the PCM 130 of the vehicle 104 receives V2V refuel request information. As such, the PCM 130 is aware that a refueling operation is going to occur and when the V2V refueling operation is expected to occur. In some examples, the V2V refuel operation is scheduled for a particular time. In other examples, the V2V refuel operation is scheduled to occur during a time window. In some examples, the V2V refuel operation information is stored in the database 128 (FIG. 1).

At block 606, the PCM 130 monitors for the opening of the fuel door 124, which is an indication that the refueling operation is about to occur. For example, in the illustrated example of FIG. 2, the fuel door sensor 232 detects or senses when the fuel door 124 is opened. At block 608 of FIG. 6, the PCM 130 determines if the fuel door 124 is open. If the fuel door 124 is not open, the PCM 130 continues to monitor for the opening of the fuel door 124 (block 606). In other examples, other indications or signals may be used to determine whether the refueling operation is about to occur.

If the PCM 130 determines that the fuel door 124 is open (block 608), the PCM 130 is armed (block 610). Once armed, the PCM 130 determines the refueling operation is about to occur. At block 612, the PCM 130 determines whether fuel is being added in the fuel tank 106. In some examples, the PCM 130 determines whether fuel is being added to the fuel tank 106 based on a change in the fuel level as sensed by the fuel level sensor 230. In other examples, one or more other sensors may be used in addition to or as an alternative to the fuel level sensor 230 to detect whether fuel is being dispensed into the fuel tank 106. If fuel is not being added to the fuel tank 106, the PCM 130 remains armed (block 610) and continues to determine whether fuel is being added to the fuel tank 106 (block 612).

At block 614, the PCM 130 determines whether the ground cable 118 is connected between the vehicle 104 and the refueling vehicle 110 to determine whether the vehicles 104, 110 are electrically coupled. In some examples, the PCM 130 determines whether the vehicles 104, 110 are electrically coupled based on a signal from the grounding circuit 132. For example, as illustrated in FIGS. 2 and 3, if the ground cable 118 is not connected, the grounding switch 258 is open and a signal is not produced at the PCM 130. If a signal is not produced in the PCM 130, the PCM 130 determines the ground cable 118 has not been connected between the vehicles 104, 110 and the vehicles 110, 104 are not electrically coupled.

If the vehicles 104, 110 are not electrically coupled (e.g., if the ground cable 118 has not been connected between the vehicles 104, 110), the PCM 130 closes the CVS valve 216 (and/or the VBV 210) at block 616. Closing the CVS valve 216 causes a shutoff at the pump handle 116. In particular, the displaced air in the fuel tank 106 cannot be vented through the vent passageway 218 and, thus, the displaced air travels back up through the inlet nozzle 202 and triggers the sensing port in the pump handle 116 to shutoff the pump 231. The service operator 108 may release and reapply the trigger 229 to begin dispensing fuel again, but the same effect occurs. Otherwise, the service operator 108 can pump fuel but at a relatively slow rate such that the displacement air does not trigger the shutoff. In this manner, the PCM 130 prevents or substantially impedes (e.g., by slowing the refueling rate) refueling that would otherwise create an electrical potential.

The PCM 130 continues to monitor the fueling (block 612) and determine if the ground cable 118 is connected (block 614). If the ground cable 118 is not connected, the CVS valve 216 remains closed (block 616). Otherwise, if the ground cable 118 is connected, the PCM 130 receives a signal from the grounding circuit 132, and the PCM 130 instructs the CVS valve 216 (and the VBV 210 if closed) to open at block 618. If the ground cable 118 was connected prior to refueling, the CVS valve 216 remains open (e.g., to vent the displaced air). In some examples, the PCM 130 continues to monitor for the ground connection to ensure the ground cable 118 is connected throughout the refueling operation. For example, the ground cable 118 may accidently be pulled from the vehicle 104 during refueling. In such an example, the PCM 130 instructs the CVS valve 216 to close. Once the refueling operation is completed, the example method 600 ends (block 620).

FIG. 7 is a flowchart of another example method 700 implemented by the vehicle 104 of FIG. 1 to prevent or impede a V2V refueling operation without a ground connection. The method 700 of FIG. 7 may be performed at least in part by the PCM 130 and applies to a vehicle having a sealed fuel tank with a locked fuel door, such as the example vehicle 104 described in connection with FIG. 5.

At block 702, the fuel door 124 is locked by the solenoid actuated lock 502. In some examples, the vent passageway 218 is closed, and the fuel door 124 is locked to prevent a person from accessing the inlet nozzle 202 until the fuel tank 106 is depressurized. For example, the VBV 210 and/or the CVS valve 216 may be closed. As such, the vent passageway 218 is closed, which traps fuel vapors in the fuel tank 106.

At block 704, the PCM 130 of the vehicle 104 receives V2V refuel request information. As such, the PCM 130 is aware that a refueling operation is going to occur and when the V2V refueling operation is expected to occur. In some examples, the V2V refuel operation is scheduled for a particular time. In other examples, the V2V refuel operation is scheduled to occur during a time window. In some examples, the V2V refuel operation information is stored in the database 128 (FIG. 1).

At block 706, the PCM 130 monitors for the ground cable 118. At block 708, the PCM 130 determines if the ground cable 118 is connected to the vehicle 104. In some examples, the PCM 130 determines whether the ground cable 118 is connected based on a signal from the grounding circuit 132. For example, as illustrated in FIG. 5, when the ground cable 118 is connected, the grounding circuit 132 generates a signal at the PCM 130, which is an indication the ground cable 118 is connected and the vehicles 104, 110 are electrically coupled. If the signal is not produced at the PCM 130, the PCM 130 determines the ground cable 118 is not connected to the vehicle 104, and the PCM 130 continues to monitor for and determine whether the ground wire is connected (blocks 706 and 708).

If the ground cable 118 is connected, a signal is generated at the PCM 130, and the PCM 130 opens the VBV 210 (and the CVS valve 216, if not already opened) in the vent passageway 218 to vent the fuel tank 106 at block 710. Opening the VBV 210 and the CVS valve 216 enables any positive or negative pressure in the fuel tank 106 to stabilize with the atmospheric pressure. Thus, the PCM 130 depressurizes (or pressurizes) the fuel tank 106. At block 712, the PCM 130 determines when the pressure in the fuel tank 106 is substantially equal to the atmospheric pressure (e.g., depressurized). In some examples, the PCM 130 determines the pressure in the fuel tank based on a measurement from the FTPT 228. If the pressure in the fuel tank 106 has not yet stabilized, the PCM 130 continues to wait and monitor the pressure the fuel tank 106. In some examples, depressurization takes about 15-30 seconds. In other examples, depressurization may take more or less time.

At block 714, the pressure in the fuel tank 106 is equalized, and the PCM 130 unlocks the fuel door 124 via the solenoid actuated lock 502. Once the fuel door 124 is unlocked, the service operator 108 may insert the pump handle 116 and begin the V2V refueling operation. During the refueling operation, the PCM 130 continues to monitor that the ground cable 118 is connected, at block 716. At block 718, the PCM 130 determines whether the ground cable 118 is connected, based on the signal generated by the grounding circuit 132. If the ground cable 118 remains connected throughout the V2V refueling operation, the PCM 130 enables the VBV 210 and the CVS valve 216 to remain open. When the refueling is complete, the PCM 130 may instruct the VBV 210 and/or the CVS valve 216 to close and/or instruct the solenoid actuated lock 502 to lock the fuel door 124 and the example method ends at block 720.

However, if the PCM 130 determines the ground cable 118 is not connected (e.g., the ground cable 118 was accidently pulled from the vehicle 104), the PCM 130 instructs the VBV 210 and/or the CVS valve 216 to close (block 722), thereby closing the vent passageway 218. As a result, displaced air from the fuel tank 106 triggers a shut off of the pump handle, as described above. At block 724, the PCM 130 continues to determine whether the ground cable 118 has been reconnected. If not, the VBV 210 and/or the CVS valve 216 remain closed. Otherwise, if the ground cable 118 is reconnected (as determined by a signal in the PCM 130), the PCM 130 instructs the VBV 210 and the CVS valve 216 to open at block 726. The PCM 130 continues to monitor for the ground cable 118 throughout the V2V refueling operation at block 716.

Figure 8:
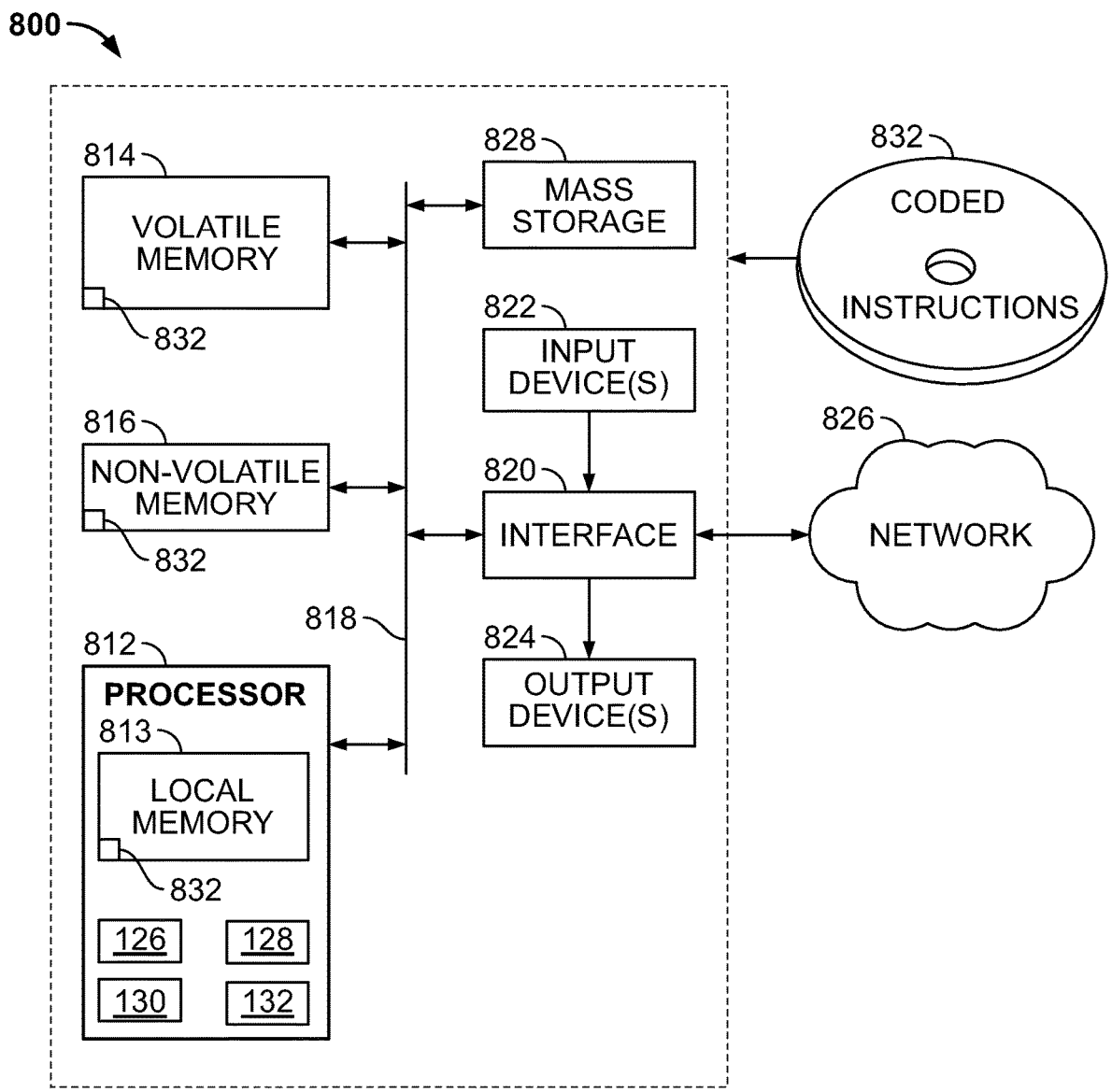
FIG. 8 is a block diagram of an example processor system structured to execute example machine readable instructions represented at least in part by FIGS. 6 and 7 to implement the example vehicle of FIG. 1.

FIG. 8 is a block diagram of an example processor platform 800 capable of executing instructions to implement the methods of FIGS. 7 and 8, which may be performed at least in part by the PCM 130 of the vehicle 104 of FIG. 1. The processor platform 800 can be, for example, a server, a personal computer, a mobile device (e.g., a cell phone, a smart phone, a tablet such as an iPad™), a personal digital assistant (PDA), an Internet appliance, or any other type of computing device.

The processor platform 800 of the illustrated example includes a processor 812. The processor 812 of the illustrated example includes hardware that may implement one or more of the example TCU 126, the example database 128, the example PCM 130 and/or the example grounding circuit 132 of the example vehicle 104 of FIG. 1. For example, the processor 812 can be implemented by one or more integrated circuits, logic circuits, microprocessors or controllers from any desired family or manufacturer.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

Coded instructions 832 to implement the methods 600 and 700 of FIGS. 6 and 7 may be stored in the mass storage device 828, in the volatile memory 814, in the non-volatile memory 816, and/or on a removable tangible computer readable storage medium such as a CD or DVD.

From the foregoing, it will be appreciated that the above disclosed methods, apparatus/systems and articles of manufacture prevent or impede V2V refueling operations unless the vehicles are electrically coupled. As such, the above disclosed methods, apparatus/system and articles of manufacture eliminate or significantly reduce the risk of electrostatic potential between the two vehicles. Thus, the examples disclosed herein achieve safer refueling environments.

Although certain example methods, apparatus/systems and articles of manufacture have been disclosed herein, the scope of coverage of this patent is not limited thereto. On the contrary, this patent covers all methods, apparatus/systems and articles of manufacture fairly falling within the scope of the claims of this patent.

What is claimed is:

1. A vehicle to receive fuel from a refueling vehicle via a vehicle-to-vehicle refueling operation, the vehicle including:
    a fuel tank having a vent passageway;
    a valve coupled to the vent passageway;
    a grounding circuit; and
    a controller to:
        determine whether the vehicle and the refueling vehicle are electrically coupled by a ground cable based on a signal from the grounding circuit;
        open the valve when the vehicle and the refueling vehicle are electrically coupled by the ground cable; and
        close the valve when the vehicle and the refueling vehicle are not electrically coupled by the ground cable during the vehicle-to-vehicle refueling operation.

2. The vehicle of claim 1, wherein the grounding circuit generates the signal when the vehicle and the refueling vehicle are electrically coupled by the ground cable.

3. The vehicle of claim 1, wherein the grounding circuit includes a relay, and wherein the relay is energized when the vehicle and the refueling vehicle are electrically coupled by the ground cable.

4. The vehicle of claim 3, wherein, when the relay is energized, the grounding circuit is closed and generates the signal and, when the relay is not energized, the grounding circuit is open.

5. The vehicle of claim 1, wherein the controller is to determine when fuel is being added to the fuel tank, and wherein the controller is to close the valve if the vehicle and the refueling vehicle are not electrically coupled by the ground cable and fuel is being added to the fuel tank.

6. The vehicle of claim 1 further including a connector to receive the ground cable.

7. The vehicle of claim 6, wherein the connector is disposed on a side of the vehicle adjacent a fuel door of the vehicle.

8. The vehicle of claim 1, wherein the controller is to be armed when a fuel door of the vehicle is opened.

9. The vehicle of claim 1, wherein the valve includes at least one of a vapor bypass valve (VBV) or a canister vent shut (CVS) valve.

10. A method comprising:
    determining, via a controller, whether a first vehicle is electrically coupled to a second vehicle with a ground cable based on a signal from a grounding circuit, the first vehicle to receive fuel from the second vehicle during a vehicle-to-vehicle refueling operation;
    determining, via the controller, whether fuel is being added to a fuel tank of the first vehicle;
    opening, via the controller, a valve in a vent passageway of the fuel tank based on a determination by the controller that the first and second vehicles are electrically coupled with the around cable; and
    closing, via the controller, the valve in the vent passageway of the fuel tank based on a determination by the controller that the first and second vehicles are not electrically coupled with the ground cable and fuel is being added to the first vehicle.

11. The method of claim 10, wherein determining whether fuel is being added to the first vehicle includes detecting a change in fuel level in the fuel tank of the first vehicle.

12. The method of claim 1, further including, prior to determining whether the first and second vehicles are electrically coupled with the ground cable, detecting whether a fuel door of the first vehicle is opened.

13. The method of claim 10, wherein the valve includes at least one of a vapor bypass valve (VBV) or a canister vent shut (CVS) valve.

14. A non-transitory computer readable medium comprising instructions that, when executed, cause a processor to at least:
    determine whether a first vehicle is electrically coupled to a second vehicle via a ground cable based on a signal from a grounding circuit, the first vehicle to receive fuel from the second vehicle during a vehicle-to-vehicle refueling operation;
    determine whether fuel is being added to a fuel tank of the first vehicle;
    open a valve in a vent passageway of the fuel tank based on a determination that the first and second vehicles are electrically coupled via the ground cable; and
    close the valve in the vent passageway of the fuel tank based on a determination that the first and second vehicles are not electrically coupled via the ground cable and fuel is being added to the first vehicle.

* * * * *

UNITED STATES PATENT AND TRADEMARK OFFICE
CERTIFICATE OF CORRECTION

PATENT NO. : 11,097,940 B2
APPLICATION NO. : 16/343564
DATED : August 24, 2021
INVENTOR(S) : Dudar et al.

Page 1 of 1

It is certified that error appears in the above-identified patent and that said Letters Patent is hereby corrected as shown below:

In the Claims

Column 22, Line 20 (Claim 10): Replace "around" with --ground--.

Column 22, Line 29 (Claim 12): Replace "claim 1" with --claim 10--.

Signed and Sealed this
Twenty-sixth Day of October, 2021

Drew Hirshfeld
*Performing the Functions and Duties of the
Under Secretary of Commerce for Intellectual Property and
Director of the United States Patent and Trademark Office*